United States Patent
Sakuma et al.

(10) Patent No.: US 11,535,735 B2
(45) Date of Patent: Dec. 27, 2022

(54) PROPYLENE-BASED BLOCK COPOLYMER, PRODUCTION METHOD THEREFOR, AND SOLID TITANIUM CATALYST INGREDIENT FOR OLEFIN POLYMERIZATION

(71) Applicant: MITSUI CHEMICALS, INC., Tokyo (JP)

(72) Inventors: Atsushi Sakuma, Hatsukaichi (JP); Kazutaka Tsuru, Yanai (JP); Kenichiro Okamura, Hiroshima (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/978,513

(22) PCT Filed: Mar. 7, 2019

(86) PCT No.: PCT/JP2019/008982
§ 371 (c)(1),
(2) Date: Sep. 4, 2020

(87) PCT Pub. No.: WO2019/172350
PCT Pub. Date: Sep. 12, 2019

(65) Prior Publication Data
US 2020/0399454 A1    Dec. 24, 2020

(30) Foreign Application Priority Data
Mar. 7, 2018   (JP) .............................. JP2018-040597

(51) Int. Cl.
*C08L 23/14*     (2006.01)
*C08F 4/654*    (2006.01)
(Continued)

(52) U.S. Cl.
CPC .............. *C08L 23/14* (2013.01); *C08F 4/654* (2013.01); *C08F 210/06* (2013.01); *C08F 297/083* (2013.01)

(58) Field of Classification Search
CPC ........ C08L 23/14; C08L 23/142; C08F 4/654; C08F 210/06; C08F 297/083
See application file for complete search history.

(56) References Cited

U.S. PATENT DOCUMENTS

| 6,627,710 B1 | 9/2003 | Sacchetti et al. |
| 2003/0153454 A1 | 8/2003 | Hosoka et al. |

(Continued)

FOREIGN PATENT DOCUMENTS

| CN | 101087821 | 12/2007 |
| EP | 0 076 653 A1 | 4/1983 |

(Continued)

OTHER PUBLICATIONS

International Searching Authority, "International Search Report," issued in connection with International Patent Application No. PCT/JP2019/008982, dated Jun. 4, 2019.
(Continued)

*Primary Examiner* — Catherine S Branch
(74) *Attorney, Agent, or Firm* — Foley & Lardner LLP (57) ABSTRACT

The purpose of the present invention is to provide a propylene-based block copolymer, the deposition thereof on the inner wall of the polymerization vessel having been sufficiently inhibited. The propylene-based block copolymer of the present invention has a flowability evaluation value of 40% or less, the value being calculated with the following equation wherein X (sec) is the number of seconds over which 100 g of the copolymer having ordinary temperature falls from a stainless-steel funnel having an inner diameter of 11.9 mm and Y (sec) is the number of seconds over which
(Continued)

100 g of the copolymer which has been held at 80° C. for 24 hours under a load of 10 kg falls from the funnel having an inner diameter of 11.9 mm.

Flowability evaluation value (%)={($Y/X$)−1}×100.

5 Claims, 1 Drawing Sheet

(51) Int. Cl.
  *C08F 210/06* (2006.01)
  *C08F 297/08* (2006.01)

(56) References Cited

U.S. PATENT DOCUMENTS

| | | |
|---|---|---|
| 2008/0038498 A1 | 2/2008 | Itakura et al. |
| 2020/0299422 A1 | 9/2020 | Kono et al. |

FOREIGN PATENT DOCUMENTS

| | | |
|---|---|---|
| EP | 0 344 755 A1 | 12/1989 |
| EP | 2 330 139 A1 | 6/2011 |
| EP | 3 115 379 A1 | 1/2017 |
| JP | S58-57407 A | 4/1983 |
| JP | 2002-356507 A | 12/2002 |
| JP | 2003-502487 A | 1/2003 |
| JP | 2016-204649 A | 12/2016 |
| JP | 2017-002118 A | 1/2017 |
| JP | 2017-132870 A | 8/2017 |
| JP | 2002-030128 A | 1/2022 |
| WO | WO-2005/102973 A1 | 11/2005 |
| WO | WO-2007/035485 A1 | 3/2007 |
| WO | WO-2015/177733 A2 | 11/2015 |
| WO | WO-2017/170077 A | 10/2017 |

OTHER PUBLICATIONS

International Searching Authority, "Written Opinion," issued in connection with International Patent Application No. PCT/JP2019/008982, dated Jun. 4, 2019.

Debling, et al., "Morphological development of impact polypropylene produced in gas phase with a TiCl4/MgCl2 catalyst", Journal of Applied Polymer Science, vol. 81, No. 13, pp. 3085-3106, (2001).

European Extended Search Report, dated Nov. 29, 2021, issued in corresponding European Patent Application No. 19765075.7, (12 pages).

PROPYLENE-BASED BLOCK COPOLYMER, PRODUCTION METHOD THEREFOR, AND SOLID TITANIUM CATALYST INGREDIENT FOR OLEFIN POLYMERIZATION

CROSS-REFERENCE TO RELATED APPLICATIONS

The present application claims priority under 37 U.S.C. § 371 to International Patent Application No. PCT/JP2019/008982, filed Mar. 7, 2019, which claims priority to and the benefit of Japanese Patent Application No. 2018-040597, filed on Mar. 7, 2018. The contents of these applications are hereby incorporated by reference in their entireties.

TECHNICAL FIELD

The present invention relates to a propylene block copolymer, a method for producing the propylene block copolymer, and a solid titanium catalyst component for olefin polymerization.

BACKGROUND ART

Propylene resins are used in various fields such as daily goods, kitchen utensils, packaging films, household electrical appliances, machine parts, electric parts, and automotive parts.

In some applications, propylene block copolymers are used that are obtained by directly polymerizing a propylene polymer, for example, with a rubber component, an amorphous or low-crystallinity ethylene•propylene copolymer (EPR), and an amorphous ethylene•α-olefin copolymer so as to have improved properties such as higher impact resistance. However, it is known that propylene block copolymers tend to adhere to the inner wall of a polymerizer and that the polymers tend to adhere to each other during storage.

For example, PTL 1 reports a method of increasing the flowability of a propylene block copolymer, for example, by feeding a flow improver in polymerizing a propylene polymer with the rubber component.

PTL 2 discloses a method of introducing a large amount of rubber component by controlling the shape of a solid titanium catalyst component for producing a propylene block polymer.

CITATION LIST

Patent Literature

PTL 1
Japanese Patent Application Laid-Open No. 2017-132870
PTL 2
Japanese Patent Application Laid-Open No. 2002-356507

SUMMARY OF INVENTION

Technical Problem

However, when a propylene block copolymer was produced by the method described in PTL 1, adhesion to the inner wall of a polymerizer could not sufficiently be suppressed.

Although PTL 2 discloses that a propylene block copolymer having high flowability despite a high rubber content can be provided, calculations based on the experimental data have suggested that the rubber component in propylene block copolymers with high rubber contents disclosed in Examples is a rubber component that has a relatively low ethylene unit content (that is relatively hard and less easily flows).

The present invention has been made in view of the above-described problems of the related art, and an object thereof is to provide a propylene block copolymer whose adhesion to the inner wall of a polymerizer can be sufficiently suppressed, a method for producing the propylene block copolymer, and a solid titanium catalyst component for producing the propylene block copolymer. Preferably, the propylene block copolymer is a propylene block copolymer whose adhesion to the inner wall of a polymerizer can be sufficiently controlled despite an easily flowable rubber component having a relatively high ethylene unit content.

Solution to Problem

[1] A propylene block copolymer having an evaluated flowability value of 40% or less,
the evaluated flowability value being calculated by the following formula:

Evaluated flowability value (%)=$\{(Y/X)-1\}100$ where X (sec) is the number of seconds required for 100 g of the copolymer at normal temperature to fall through a stainless steel funnel having an inner diameter of 11.9 mm, and
Y (sec) is the number of seconds required for 100 g of the copolymer after being held at 80° C. for 24 hours under a load of 10 kg to fall through the funnel having an inner diameter of 11.9 mm.

[2] The propylene block copolymer according to [1], wherein a Dsol content relative to 100 mass % of a total amount of a component soluble in n-decane at 23° C. (Dsol) and a component insoluble in n-decane at 23° C. (Dinsol) is 30 mass % or more and 40 mass % or less.

[3] The propylene block copolymer according to [2], wherein the Dsol has an ethylene unit content of 36.0 mol % or more.

[4] A method for producing a propylene block copolymer, the method comprising:
a first polymerization step of preparing a crystalline propylene (co)polymer by polymerizing propylene and an optional α-olefin in the presence of a solid titanium catalyst component (i) produced by bringing
a solid compound (S) containing a magnesium compound (II-0) and having a first pore distribution index of 2 or more,
the first pore distribution index being represented by formula I:

First pore distribution index=$x/y$ \hfill (I)

where x is a cumulative pore volume of pores with a size of 0.001 to 0.1 μm, and y is a cumulative pore volume of pores with a size of 0.1 to 1.0 μm, the cumulative pore volumes being measured with a mercury porosimeter,
a titanium compound represented by formula IV:

$Ti(OR)_gX_{4-g}$ \hfill (IV)

where R is a hydrocarbon group, X is a halogen atom, and g is an integer satisfying $0 \leq g \leq 4$, and
an electron donor
into contact with each other; and
a second polymerization step of polymerizing the crystalline propylene (co)polymer prepared in the first polymerization step and a raw material of a polymer selected from the group consisting of rubber components, amorphous or low-crystallinity ethylene•propylene copolymers (EPR), and amorphous ethylene•α-olefin copolymers.

[5] The method for producing a propylene block copolymer according to [4], wherein the first polymerization step and the second polymerization step are both performed in the presence of hydrogen.

[6] The method for producing a propylene block copolymer according to [4] or [5], wherein the magnesium compound (II-0) is a solid complex compound represented by formula II:

$$MgX_aRs_b \cdot (RtOH)_m \quad (II)$$

where X is a halogen atom, Rs is a heteroatom-containing hydrocarbon group, Rt is a hydrocarbon group optionally containing a heteroatom, m is a real number satisfying $2.0 \leq m \leq 3.3$, a is an integer satisfying $0 \leq a \leq 2$, b is an integer satisfying $0 \leq b \leq 2$, and a plus b is 2, provided that when a is 0 in formula II, g is not 4 in formula IV.

[7] A solid titanium catalyst component produced by bringing a solid compound (S) containing a magnesium compound (II-0) and having a first pore distribution index of 2 or more, the first pore distribution index being represented by formula I:

$$\text{First pore distribution index} = x/y \quad (I)$$

where x is a cumulative pore volume of pores with a size of 0.001 to 0.1 μm, and y is a cumulative pore volume of pores with a size of 0.1 to 1.0 μm, the cumulative pore volumes being measured with a mercury porosimeter, a titanium compound represented by formula IV:

$$Ti(OR)_gX_{4-g} \quad (IV)$$

where R is a hydrocarbon group, X is a halogen atom, and g is an integer satisfying $0 \leq g \leq 4$, and an electron donor into contact with each other.

Advantageous Effects of Invention

According to the present invention, a propylene block copolymer whose adhesion to the inner wall of a polymerizer can be sufficiently suppressed and a method for producing the propylene block copolymer are provided.

DESCRIPTION OF EMBODIMENTS

A propylene block copolymer according to the present invention has an evaluated flowability value of 40% or less. The evaluated flowability value is calculated by the following formula: evaluated flowability value (%)={(Y/X)−1}× 100. In the formula, X (sec) is the number of seconds required for 100 g of the copolymer at normal temperature to fall through a stainless steel funnel having an inner diameter of 11.9 mm, and Y (sec) is the number of seconds required for 100 g of the copolymer after being held at 80° C. for 24 hours under a load of 10 kg to fall through the funnel having an inner diameter of 11.9 mm.

Figure 1:
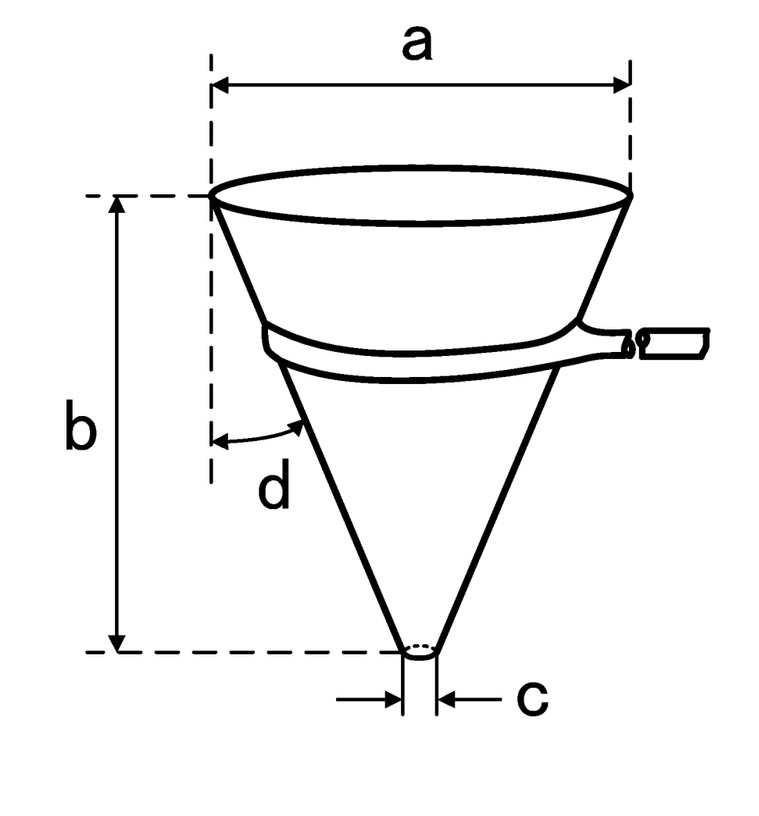
The Figure is a schematic view of a funnel used to obtain the evaluated flowability value of a propylene block copolymer of the present invention.

Specifically, the funnel is a funnel having a shape illustrated in the Figure. This funnel has a shape of a truncated cone similarly to the "bulk density meter" illustrated in FIG. 2 in Appendix of JIS K 6720 (1998), excepting that the top diameter (the length of a in the Figure) is 94.9 mm; the height of a truncated conical portion (the length of b in the Figure) is 114 mm; and the inner diameter of a particle fall portion (the length of c in the Figure) is 11.9 mm. The inclination of a slanting surface of the truncated cone (the angle of d in the Figure) is 20°.

The propylene block copolymer, when flowing through a polymerizer made of metal, particularly, stainless steel, a flow path, or the like, is less likely to adhere to the inner wall of the polymerizer, the wall of the flow path, or the like.

1. Propylene Block Copolymer

The propylene block copolymer is a copolymer obtained by directly polymerizing a propylene polymer with a rubber component, an amorphous or low-crystallinity ethylene•propylene copolymer (EPR), an amorphous ethylene•α-olefin copolymer, and the like. The propylene block copolymer of the present application is preferably in the form of particles, and is more preferably a propylene block copolymer particle formed during polymerization described later.

The propylene block copolymer is not particularly limited as long as it is a block copolymer containing a structural unit derived from propylene. In view of, for example, a good balance of high rigidity, high impact resistance, and high moldability and the ease of obtaining a molded product with a good appearance, the propylene block copolymer is preferably a copolymer containing a rubber component, more preferably a copolymer containing a component soluble in n-decane at 23° C. (hereinafter also referred to as a "Dsol component") and a component insoluble in n-decane at 23° C. (hereinafter also referred to as "Dinsol").

When the propylene block copolymer is dissolved in n-decane at 150° C. for 2 hours under heating and the temperature is then decreased to 23° C., a component dissolved in the n-decane solution is the Dsol component, and other component in the propylene block copolymer is the Dinsol component.

The Dsol component may be a component composed mainly of the rubber component, and is preferably a component composed mainly of a copolymer rubber component formed of propylene and at least one α-olefin selected from ethylene and α-olefins having 4 to 20 carbon atoms. More specifically, the amount of rubber component in the Dsol component is more than 50 mass %, preferably 80 mass % or more and 100 mass % or less, more preferably 90 mass % or more and 100 mass % or less.

Examples of the α-olefins having 4 to 20 carbon atoms include 1-butene, 1-pentene, 1-hexene, 4-methyl-1-pentene, 1-octene, 1-decene, 1-dodecene, 1-tetradecene, 1-hexadecene, 1-octadecene, and 1-eicosene. The α-olefin to be copolymerized is preferably ethylene or an α-olefin selected from α-olefins having 4 to 10 carbon atoms, more preferably an α-olefin selected from ethylene, 1-butene, 1-pentene, 1-hexene, 4-methyl-1-pentene, 1-octene, and 1-decene.

The amount of structural unit derived from at least one α-olefin selected from ethylene and α-olefins having 4 to 20 carbon atoms contained in the Dsol component is larger than the amount of structural unit derived from ethylene or an α-olefin having 4 to 20 carbon atoms contained in a crystalline propylene (co)polymer component described later or in the decane insoluble component (Dinsol component), and typically 25 mol % or more of the copolymer rubber.

In particular, since a Dsol component containing ethylene units tends to have a low glass transition temperature, the Dsol component preferably contains a large amount of ethylene units. The lower limit of the ethylene unit content in the Dsol component is preferably 30 mol %, more preferably 36.0 mol %, still more preferably 40 mol %. The upper limit is preferably 70 mol %, more preferably 65 mol %, still more preferably 60 mol %.

When the ethylene unit content is relatively high, the rubber component has a low glass transition temperature and low crystallinity, and thus the rubber component tends to be soft and easily flowable particularly at high temperature. In the present invention, the propylene block copolymer, while containing a large amount of such an easily flowable rubber component, is less likely to adhere to the inside of a polymerizer or a silo described later and thus is easy to produce.

In view of, for example, the ease of obtaining a molded product having a good balance of high rigidity and high impact resistance, the content of the Dsol component in the propylene block copolymer relative to 100 mass % of the total amount of the Dsol component and the Dinsol component is preferably 5 mass % or more and 50 mass % or less, more preferably 10 mass % or more and 50 mass % or less, still more preferably 25 mass % or more and 50 mass % or less, particularly preferably 30 mass % or more and 40 mass % or less.

In view of, for example, the ease of obtaining a composition having a good balance of high impact resistance, high flowability, and high melt elasticity and the ease of obtaining a molded product with a good appearance, the limiting viscosity [η] of the Dsol component is preferably 1.5 dl/g or more and 10.0 dl/g or less, more preferably 2.0 dl/g or more and 7.0 dl/g or less.

The [η] may be a value of ηsp/C at the time when a concentration (C) is extrapolated to 0 in a relational expression showing the relationship between concentration and specific viscosity. The relational expression is obtained in the following manner: 20 mg of a propylene block copolymer is dissolved in 15 ml of decalin, and a specific viscosity ηsp is measured in an oil bath at 135° C.; and after the decalin solution is diluted by addition of 5 ml of a decalin solvent, a specific viscosity ηsp is measured in the same manner, which operation is further repeated three times.

The Dinsol component is a component composed mainly of a crystalline propylene (co)polymer component. More specifically, the amount of crystalline propylene (co)polymer component in the Dinsol component is more than 50 mass %, preferably 80 mass % or more and 100 mass % or less, more preferably 90 mass % or more and 100 mass % or less.

The crystalline propylene (co)polymer component is a crystalline propylene homopolymer or a copolymer of propylene and at least one α-olefin selected from α-olefins consisting of ethylene and α-olefins having 4 to 20 carbon atoms. The amount of structural unit derived from the α-olefin is 1.5 mol % or less of the crystalline propylene (co)polymer component.

In view of, for example, the ease of obtaining a molded product having a good balance of high rigidity and high impact resistance, the content of the Dinsol component in the propylene block copolymer relative to 100 mass % of the total amount of the Dsol component and the Dinsol component is preferably 50 mass % or more and 95 mass % or less, more preferably 50 mass % or more and 90 mass % or less, still more preferably 50 mass % or more and 75 mass % or less, particularly preferably 60 mass % or more and 70 mass % or less.

Examples of the α-olefins having 4 to 20 carbon atoms include 1-butene, 1-pentene, 1-hexene, 4-methyl-1-pentene, 1-octene, 1-decene, 1-dodecene, 1-tetradecene, 1-hexadecene, 1-octadecene, and 1-eicosene. The α-olefin to be copolymerized is preferably ethylene or an α-olefin selected from α-olefins having 4 to 10 carbon atoms, more preferably an α-olefin selected from ethylene, 1-butene, 1-pentene, 1-hexene, 4-methyl-1-pentene, 1-octene, and 1-decene.

The melt flow rate (MFR) of the propylene block copolymer measured at 230° C. under a load of 2.16 kg may be 5 g/10 min or more and 300 g/10 min or less and is preferably 5 g/10 min or more and 200 g/10 min or less.

When the MFR is in the above range, the propylene block copolymer has high flowability, and thus a composition that can be readily injection molded is obtained from the propylene block copolymer. Furthermore, a molded product having higher impact resistance and suitable for use in automotive parts and the like can be readily obtained from the composition.

In view of the ease of obtaining a molded product having a better balance of rigidity and impact resistance, the content of the propylene block copolymer relative to the total mass of the composition is preferably 58 mass % or more and 90 mass % or less, more preferably 60 mass % or more and 90 mass % or less.

The composition may contain other components such as resins other than the propylene block copolymer, light stabilizers, heat stabilizers, weathering stabilizers, age resisters, antioxidants, metal salts of fatty acids, softeners, dispersants, fillers, colorants, pigments, antistatic agents, slip agents, antiblocking agents, antifogging agents, lubricants, natural oils, synthetic oils, and waxes.

2. Production of Propylene Block Copolymer

The propylene block polymer is obtained by first synthesizing a component constituting the Dinsol component, particularly, the crystalline propylene (co)polymer, and then polymerizing the component constituting the Dinsol component with a component constituting the Dsol component, particularly, the rubber component. The synthesis of the component constituting the Dinsol component and the polymerization of the component constituting the Dsol component are performed using a solid titanium catalyst component (i) as a catalyst, the solid titanium catalyst component (i) being produced using a solid compound (S) below as a starting material, whereby the above-described evaluated flowability value can be 40 or less. The solid compound is preferably a solid compound as described below.

2-1. Production of Solid Titanium Catalyst Component (i)

The solid titanium catalyst component (i) can be produced by bringing a solid compound (S) having a first pore distribution index represented by formula I below of 2 or more and a titanium compound into contact with each other. At this time, to increase the molecular weight of a polymer to be obtained and to help control the molecular weight distribution of the polymer, an electron donor may be further brought into contact to incorporate the electron donor into the solid titanium catalyst component (i).

$$\text{First pore distribution index} = x/y \quad \text{(I)}$$

In formula I, x is a cumulative pore volume of pores with a size of 0.001 to 0.1 μm, and y is a cumulative pore volume of pores with a size of 0.1 to 1.0 μm, the cumulative pore volumes being measured with a mercury porosimeter.

The lower limit of the first pore distribution index is preferably 2.0, more preferably 2.1, still more preferably 2.2. On the other hand, the upper limit is not particularly limited, and is preferably 12, more preferably 10, still more preferably 8, particularly preferably 7.

Formula I above is a parameter indicating that the amount of pores with relatively small pore sizes, that is, 0.001 to 0.1 μm is considerably larger than the amount of pores with relatively large pore sizes, that is, 0.1 to 1.0 μm. In other words, formula I is a parameter indicating that the amount of relatively small and deep-shaped pores tends to be large.

The solid compound (S) preferably has a second pore distribution index represented by formula I' below of more than 0.5. The second pore distribution index is more preferably 0.56 or more, still more preferably 0.58 or more, particularly preferably 0.60 or more, especially preferably 0.62 or more. The upper limit is of course 1, more preferably 0.745.

Second pore distribution index=$x\alpha/x\beta$ (I')

In formula I', $x\alpha$ is a cumulative pore volume of pores with a size of 0.01 to 0.1 μm, and $x\beta$ is a cumulative pore volume of pores with a size of 0.001 to 1.0 μm, the cumulative pore volumes being measured with a mercury porosimeter.

The second pore distribution index indicates that in the catalyst of the present invention, pores with a size of 0.01 to 0.1 μm are dominantly present on a volume basis. It can be readily inferred that the presence of pores with this size has a great influence on high particle flowability, which is the feature of the present invention.

The pore volume of pores with a size of 0.001 to 1.0 μm in the solid compound according to the present invention is not particularly limited as long as it is within the object of the present invention. Preferably, the pore volume is 50 mm³/g or more and 1500 mm³/g or less. The lower limit is more preferably 80 mm³/g, still more preferably 100 mm³/g, particularly preferably 120 mm³/g. The upper limit is more preferably 1000 mm³/g, still more preferably 800 mm³/g, particularly preferably 500 mm³/g.

A pore volume within this range tends to produce beneficial effects such as suppression of the above-described blocking properties.

The propylene block copolymer of the present invention has the feature of being less likely to fuse to the inner wall of, for example, a polymerizer or a silo. The present inventors believe that the stipulation of formula I above is important to achieve this feature. While the mechanism thereof has yet to be elucidated at present, it can be presumed as described below.

It is said that the shape of a solid compound used as a raw material tends to be maintained to the solid titanium catalyst component (i). Accordingly, the present inventors consider that in the solid compound (S) having a shape satisfying the above stipulation, the proportion of relatively small pores with a particular size is large, and thus surface frictional resistance due to the wide surface area can probably reduce the likelihood of the occurrence of bleeding of the rubber component on the surface.

However, if the pore size is excessively small, spread of the rubber component to the surface like, for example, eruption of a volcano may readily occur. If the pore size is excessively large, pores may be combined together inside the solid compound, which rather increases the likelihood that the rubber component bleeds on the surface.

Thus, the present inventors believe that the presence of a large proportion of pores with a size in a particular range is an important requirement for producing the advantageous effects of the present invention.

2-1-1. Solid Compound (S)

The solid compound (S) is characterized by containing a magnesium compound (II-0). Preferred magnesium compounds are magnesium compounds used for a starting complex described later.

The solid compound (S) preferably has a structure of a solid compound having a composition represented by formula II.

$MgX_a Rs_b \cdot (RtOH)_m$ (II)

In formula II, X is a halogen atom, Rs is a heteroatom-containing hydrocarbon group, Rt is a hydrocarbon group optionally containing a heteroatom, m is a real number satisfying 2.0≤m≤3.3, a is an integer satisfying 0≤a≤2, b is an integer satisfying 0≤b≤2, and a plus b is 2.

Rs in formula II may be, for example, an alkoxy group, an aryloxy group, or a carboxylate group.

The structure represented by RtOH in formula II is a structure derived from an alcohol represented by RtOH. Examples of the alcohol include aliphatic alcohols including methanol, ethanol, propanol, butanol, isobutanol, ethylene glycol, 2-methyl pentanol, 2-ethyl butanol, n-heptanol, n-octanol, 2-ethyl hexanol, decanol, and dodecanol; alicyclic alcohols including cyclohexanol and methylcyclohexanol; aromatic alcohols including benzyl alcohol and methylbenzyl alcohol; and alkoxy-containing aliphatic alcohols including n-butyl cellosolve.

The solid compound (S) represented by formula II can be produced, for example, by continuously bringing a slurry liquid containing a complex (also referred to as a starting complex) represented by formula III and a hydrocarbon solvent into contact with an inert gas at a liquid temperature of 25° C. or more and 80° C. or less.

$MgX_a Rs_b \cdot (RtOH)_n$ (III)

In formula III, X, Rs, and Rt are the same as X, Rs, and Rt in formula II, and n is a real number satisfying 0.45≤m/n≤0.99.

The starting complex can be produced by bringing a magnesium compound into contact with an alcohol represented by RtOH described above, particularly, an alcohol that dissolves the magnesium compound by a known method. Examples of the magnesium compound include magnesium halides including magnesium chloride and magnesium bromide; alkoxymagnesium halides including methoxymagnesium chloride, ethoxymagnesium chloride, and phenoxymagnesium chloride; alkoxy magnesiums including ethoxy magnesium, isopropoxy magnesium, butoxy magnesium, and 2-ethylhexoxy magnesium; aryloxy magnesiums including phenoxy magnesium; and magnesium carboxylates including magnesium stearate.

By continuously bringing the slurry liquid containing a starting complex and a hydrocarbon solvent into contact with an inert gas at a liquid temperature of 25° C. or more and 80° C. or less, the alcohol component (RtOH) is gently removed from the starting complex to produce the solid compound (S).

The inert gas may be any gas that is substantially unreactive with titanium compounds and organometallic compounds. Examples of such a gas include noble gases including helium, neon, and argon; hydrocarbon gases including methane, ethane, and propane; and nitrogen.

The slurry concentration of the slurry liquid is not particularly limited, and in view of flowability and the ability to protect the solid compound (S), it is preferably 10 g/L or more and 200 g/L or less, more preferably 30 g/L or more and 150 g/L or less.

The liquid temperature of the slurry liquid during the contact is 25° C. or more to increase the alcohol removal efficiency of the inert gas, and is 80° C. to suppress denaturalization of the solid compound (S). For these reasons, the liquid temperature during the contact is preferably 25° C. or more and 80° C. or less, more preferably 40° C. or more and 70° C. or less.

The feed rate of the inert gas per liter of the slurry liquid is preferably 5 NL/hr or more and 300 NL/hr or less, more preferably 5 NL/hr or more and 40 NL/hr or less, still more preferably 5 NL/hr or more and 30 NL/hr or less, particularly preferably 5 NL/hr or more and 25 NL/hr or less, especially preferably 7 NL/hr or more and 20 NL/hr or less. When the feed rate is 5 NL/hr or more, the alcohol removal efficiency of the inert gas can be sufficiently increased.

The feed time of the inert gas is preferably 1 hour or more and 60 hours or less, more preferably 3 hours or more and 40 hours or less, still more preferably 3 hours or more and 36 hours or less, particularly preferably 3 hours or more and 20 hours or less, especially preferably 5 hours or more and 15 hours or less. When the feed rate is 1 hour or more, the alcohol removal efficiency of the inert gas can be sufficiently increased.

During the time of feeding of the inert gas described above, the inside of the system can be homogenized, for example, by stirring the inside of the system, for example, with a stirring blade. Depending on how and where the inert gas is fed, the inside of the system can be brought into a homogeneous state by the inert gas as if by stirring. For example, an inert gas jet hole may be disposed at a lower part in the system, or numbers of inert gas jet holes may be disposed in the system.

By appropriately adjusting the slurry concentration, the liquid temperature during the contact, the feed rate of the inert gas, and the feed time of the inert gas, the solid compound (S) having a first pore distribution index represented by formula I of 2 or more can be produced.

Since the above-described method causes a reaction in a liquid-phase environment using a hydrocarbon compound, the temperature, the amount of the inert gas responsible for alcohol removal, and the like can be relatively precisely controlled, and thus the method is effective in forming the solid compound (S) having such a highly controlled structure that satisfies formula I above.

In addition to the above-described method, a method of alcohol removal in a gas phase can also be used. In view of the ease of shape control, the above method of preparation in a liquid-phase environment is preferred.

2-1-2. Titanium Compound

The titanium compound to be brought into contact with the solid compound (S) for producing the solid titanium catalyst component (i) has a composition represented by formula IV $$\text{Ti(OR)}_g X_{4-g} \tag{IV}$$

In formula IV, R is a hydrocarbon group, X is a halogen atom, and g is an integer satisfying 0≤g≤4 (when a is 0 in formula II, g is not 4).

Examples of R in formula IV include a methyl group, an ethyl group, a propyl group, and a butyl group.

Examples of the titanium compound represented by formula IV include titanium tetrahalides including TiCl$_4$ and TiBr$_4$; alkoxytitanium trihalides including Ti(OCH$_3$)Cl$_3$, Ti(OC$_2$H$_5$)Cl$_3$, Ti(O-n-C$_4$H$_9$)Cl$_3$, Ti(OC$_2$H$_5$)Br$_3$, and Ti(O-isoC$_4$H$_9$)Br$_3$; alkoxytitanium dihalides including Ti(OCH$_3$)$_2$Cl$_2$ and Ti(OC$_2$H$_5$)$_2$Cl$_2$; alkoxytitanium monohalides including Ti(OCH$_3$)$_3$Cl, Ti(O-n-C$_4$H$_9$)$_3$Cl, and Ti(OC$_2$H$_5$)$_3$Br; and tetraalkoxytitaniums including Ti(OCH$_3$)$_4$, Ti(OC$_2$H$_5$)$_4$, Ti(OC$_4$H$_9$)$_4$, and Ti(O-2-ethylhexyl)$_4$. Of these, titanium tetrahalides are preferred, and titanium tetrachloride (TiCl$_4$) is more preferred.

2-1-3. Electron Donor

The electron donor may be, for example, an aromatic carboxylic acid ester, an alicyclic carboxylic acid ester, or a polyether compound.

In particular, the electron donor is preferably, for example, an alicyclic polycarboxylic acid ester represented by formula V or formula VI or a polyether compound.

$$R^d(COOR^e)_p \tag{V}$$

$$R^d(OCOR^e)_p \tag{VI}$$

In formula V and formula VI, $R^d$ is an alicyclic hydrocarbon having 5 to 20 carbon atoms, $R^e$ is a hydrocarbon group having 6 to 15 carbon atoms, and p is an integer of 2 or 3.

Examples of the alicyclic polycarboxylic acid ester represented by formula V include cyclohexyl-1,2-dihexanoate, cyclohexyl-1,2-dioctanoate, cyclohexyl-1,2-didecanoate, cyclohexyl-1,2-didodecanoate, cyclohexyl-1,2-diheptanoate, 3,6-dimethylcyclohexyl-1,2-dioctanate, 3,6-dimethylcyclohexyl-1,2-decenate, 3,6-dimethylcyclohexyl-1,2-dodecenate, 3-methyl-6-propylcyclohexyl-1,2-dioctanate, 3-methyl-6-propylcyclohexyl-1,2-didecenate, and 3-methyl-6-propylcyclohexyl-1,2-didodecenate.

Examples of the alicyclic polycarboxylic acid ester represented by formula VI include alicyclic polycarboxylic acid esters whose cyclic skeletons are substituted, for example, with a hydrocarbon group, including dioctyl 3,6-dimethylcyclohexane-1,2-dicarboxylate, didecyl 3,6-dimethylcyclohexane-1,2-dicarboxylate, dioctyl 3-methyl-6-ethylcyclohexane-1,2-dicarboxylate, didecyl 3-methyl-6-ethylcyclohexane-1,2-dicarboxylate, dioctyl 3-methyl-6-n-propylcyclohexane-1,2-dicarboxylate, didecyl 3-methyl-6-n-propylcyclohexane-1,2-dicarboxylate, dioctyl 3,6-diethylcyclohexane-1,2-dicarboxylate, and didodecyl 3,6-diethylcyclohexane-1,2-dicarboxylate; and alicyclic polycarboxylic acid esters whose cyclic skeletons do not have any substituent other than carboxylic acid esters, including di-n-hexyl cyclohexane-1,2-dicarboxylate, diheptyl cyclohexane-1,2-dicarboxylate, dioctyl cyclohexane-1,2-dicarboxylate, didecyl cyclohexane-1,2-dicarboxylate, and didodecyl cyclohexane-1,2-dicarboxylate.

The polyether compound is a compound having two or more ether bonds located on opposite sides of an aromatic carboxylic acid ester or a plurality of carbon atoms. Examples of the polyether compound include 1,3-diethers such as 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis(cyclohexylmethyl)1,3-dimethoxypropane.

2-1-4. Contact of Solid Compound (S), Titanium Compound, and Electron Donor

By bringing the solid compound (S), the titanium compound represented by formula IV, and, optionally, the electron donor into contact with each other, the solid titanium catalyst component (i) can be produced.

When these components are brought into contact with each other, an electron donor such as an aliphatic carboxylic acid ester, an aromatic carboxylic acid ester, an alcohol, an aldehyde, a ketone, an ether, an amine, a silane compound, or a phosphoric acid ester is further brought into contact, whereby a propylene block copolymer having higher tacticity can be obtained while maintaining high catalytic activity of the solid titanium catalyst component (i).

The contact can be performed, for example, by a known method such as (P-1) to (P-3) below.

(P-1) A slurry of the solid compound (S), the titanium compound in a liquid state, and preferably one or more electron donors described above are brought into contact with each other in a suspended state under the coexistence of an inert hydrocarbon solvent.

(P-2) A slurry of the solid compound (S), the titanium compound in a liquid state, and preferably one or more electron donors described above are brought into contact with each other in multiple steps.

(P-3) A slurry of the solid compound (S), the titanium compound in a liquid state, and preferably one or more electron donors described above are brought into contact with each other in multiple steps in a suspended state under the coexistence of an inert hydrocarbon solvent.

2-2. Production of Propylene Block Copolymer

The propylene block copolymer described above can be produced through a first polymerization step of preparing a crystalline propylene (co)polymer by polymerizing propylene and an optional α-olefin in the presence of the solid titanium catalyst component (i), preferably, the catalyst for olefin polymerization; and a second polymerization step of polymerizing the crystalline propylene (co)polymer prepared in the first polymerization step and raw materials of a rubber component, an amorphous or low-crystallinity ethylene•propylene copolymer (EPR), and an amorphous ethylene•α-olefin copolymer.

The first polymerization step and the second polymerization step may each be performed by a gas-phase polymerization method or a liquid-phase polymerization method including a bulk polymerization method, a solution polymerization method, or a suspension polymerization method.

In the first polymerization step and the second polymerization step, the solid titanium catalyst component (i) may be further brought into contact with an organometallic compound (ii) containing at least one element selected from the group consisting of group 1 elements, group 2 elements, and group 13 elements to prepare a catalyst for olefin polymerization. In doing so, an electron donor (iii) may be further brought into contact.

Examples of the organometallic compound (ii) include group 13 element-containing compounds such as organoaluminum compounds, alkylated complexes of group 1 elements and aluminum, and organometallic compound containing group 2 elements.

Examples of the electron donor (iii) include organosilicon compounds represented by formula VII, silane compounds represented by formula VIII, and compounds represented by formula IX.

$$R_n Si(OR')_{4-n} \quad (VII)$$

$$Si(OR^a)_3(NR^b R^c) \quad (VIII)$$

$$RNSi(OR^a)_3 \quad (IX)$$

In formula VII, R and R' are each a hydrocarbon group, and n is an integer of 0<n<4.

In formula VIII, $R^a$ is a hydrocarbon group having 1 to 6 carbon atoms, $R^b$ is a hydrocarbon group having 1 to 12 carbon atoms or hydrogen, and $R^c$ is a hydrocarbon group having 1 to 12 carbon atoms.

In formula IX, $R^a$ is a hydrocarbon group having 1 to 6 carbon atoms, and RN is a cyclic amino group such as a perhydroquinolino group, a perhydroisoquinolino group, a 1,2,3,4-tetrahydroquinolino group, a 1,2,3,4-tetrahydroisoquinolino group, or an octamethyleneimino group.

Examples of the organosilicon compounds represented by formula VII include diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, and cyclopentyldimethylethoxysilane.

Examples of the silane compounds represented by formula VIII include dimethylamino triethoxysilane, diethylamino triethoxysilane, diethylamino trimethoxysilane, diethylamino triethoxysilane, diethylamino tri-n-propoxysilane, di-n-propylamino triethoxysilane, methyl-n-propylamino triethoxysilane, t-butylamino triethoxysilane, ethyl-n-propylamino triethoxysilane, ethyl-iso-propylamino triethoxysilane, and methylethylamino triethoxysilane.

Examples of the compounds represented by formula IX include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane, and octamethyleneimino triethoxysilane.

The reaction temperature during the contact is preferably −30° C. or more and 150° C. or less, more preferably −25° C. or more and 130° C. or less, still more preferably −25° C. or more and 120° C. or less.

The amount of the solid titanium catalyst component (i) used in the first polymerization step and the second polymerization step per liter of a polymerization volume may be, in terms of titanium atoms, 0.0001 mmol or more and 0.5 mmol or less, and is preferably 0.005 mmol or more and 0.1 mmol or less.

The amount of the organometallic compound (ii) used in the first polymerization step and the second polymerization step per mol of titanium atoms in the polymerization system may be 1 mol or more and 2000 mol or less, and is preferably 5 mol or more and 500 mol or less.

The amount of the electron donor (iii) used in the first polymerization step and the second polymerization step per mol of the organometallic compound (ii) in the polymerization system may be 0.001 mol or more and 50 mol or less, and is preferably 0.01 mol or more and 30 mol or less, more preferably 0.05 mol or more and 20 mol or less.

The polymerization temperature in the first polymerization step and the second polymerization step may be 20° C. or more and 200° C. or less, and is preferably 30° C. or more and 100° C. or less, more preferably 50° C. or more and 90° C. or less.

The pressure (gauge pressure) in the first polymerization step and the second polymerization step may be from atmospheric pressure to 9.8 MPa, and is preferably 0.20 MPa or more and 4.9 MPa or less.

In the first polymerization step and the second polymerization step, the polymerization may be performed in the presence of hydrogen in order to provide a polymer with a lower molecular weight and adjust its melt flow rate (MFR) and Dsol limiting viscosity [η] to be in the desired ranges.

In the second polymerization step, for example, propylene serving as a raw material of the rubber component and at least one α-olefin selected from ethylene and α-olefins having 4 to 20 carbon atoms are polymerized with the crystalline propylene (co)polymer obtained in the first polymerization step. For example, when the rubber component is a propylene-ethylene copolymer rubber, the ethylene/(ethylene+propylene) gas ratio is preferably 5 mol % or more and 80 mol % or less, more preferably 10 mol % or more and 70 mol % or less, still more preferably 15 mol % or more and 60 mol % or less.

Prior to the first polymerization step and the second polymerization step, prepolymerization may be performed at a higher catalyst concentration.

EXAMPLES

The present invention will now be described in more detail with reference to examples, but the scope of the present invention is not limited to the description of the examples.

The present invention will now be described by using examples, but the present invention is not limited to the examples. In the following examples, a melt flow rate, a bulk density of a propylene polymer, a decane soluble component quantity, etc. were measured by the following methods.

(1) Melt Flow Rate (MFR)

The melt flow rate (MFR) was measured at a temperature of 230° C. in accordance with ASTM D1238E standard.

(2) Bulk Density (BD)

The bulk density (BD) was measured according to JIS K-6721 standard.

(3) Decane Soluble Component Quantity (Dsol) and Ethylene Unit Content

A measuring vessel made of glass was charged with about 3 grams of a propylene polymer (measured in $10^{-4}$ grams, the mass being represented by b (gram) in the following formula), 500 ml of decane, and a small amount of a heat stabilizer soluble in decane and having such a boiling point that the heat stabilizer will be substantially distilled off during vacuum drying described below. In a nitrogen atmosphere, these were heated to 150° C. over 2 hours under stirring with a stirrer to dissolve the propylene polymer, held at 150° C. for 2 hours, and then slowly cooled to 23° C. over 8 hours. The resulting liquid containing a propylene polymer precipitate was vacuum filtered through a 25 G-4 model glass filter manufactured by Iwata Glass Co., Ltd. The filtrate (100 ml) was collected and vacuum dried to obtain a portion of a decane soluble component, and the mass of the component was measured in $10^{-4}$ grams (the mass being represented by a (gram) in the following formula). After this operation, the decane soluble component quantity was determined by the following formula.

Decane soluble component content=100×(500×a)/(100×b)

The content of ethylene-derived units was determined as follows: the decane soluble component obtained by the vacuum drying was subjected to a 125 MHz $^{13}C$ NMR measurement (apparatus name: AVANCE III cryo-500, manufactured by Bruker BioSpin); ethylene-derived units and propylene-derived units were identified by a conventional method; and from their absorption intensity ratio, the content of ethylene-derived units was determined.

(4) Limiting Viscosity ([η]: [dl/g])

The measurement was made at 135° C. using a decalin solvent. About 20 mg of a sample was dissolved in 15 ml of decalin, and a specific viscosity ηsp was measured in an oil bath at 135° C. After the decalin solution was diluted by addition of 5 ml of a decalin solvent, a specific viscosity ηsp was measured in the same manner. This dilution operation was further repeated twice, and the value of ηsp/C at the time when a concentration (C) was extrapolated to 0 was determined as a limiting viscosity.

(5) Magnesium Content of Solid Compound

The magnesium content of a solid compound was measured by inductively coupled plasma-atomic emission spectroscopy (ICP-AES) in the following manner. An ICPS-8100 model apparatus (trade name) manufactured by Shimadzu Corporation was used as an inductively coupled plasma-atomic emission spectrometer.

(Construction of Calibration Curve Using Internal Standard Substance)

Using yttrium oxide (special grade, manufactured by Wako Pure Chemical Industries, Ltd.), Mg standard solution (1,000 ppm solution for atomic absorption spectrometry manufactured by Wako Pure Chemical Industries, Ltd. or 1,000 ppm solution for atomic absorption spectrometry manufactured by Kanto Chemical Co., Inc.), and sulfuric acid (special grade, manufactured by Wako Pure Chemical Industries, Ltd.), a plurality of solutions containing Mg and yttrium oxide at known concentrations were prepared. These were subjected to an ICP-AES measurement, and a calibration curve for a Mg concentration measurement using yttrium oxide as an internal standard substance was constructed by a conventional method.

(Measurement of Magnesium Content of Solid Compound)

In a nitrogen atmosphere, about 200 mg of a solid compound was precisely weighed to 0.1 mg (the mass being represented by (α)). This was dissolved in distilled water and sulfuric acid, and a predetermined amount of yttrium oxide solution was further added thereto. The resulting solution was transferred to a measuring flask with a capacity (β) and diluted with distilled water to prepare a sample solution. The sample solution was subjected to an ICP-AES measurement, and the Mg concentration (γ) of the sample solution was measured using the above calibration curve. From these results, the Mg content (M) of the solid compound was calculated by the following formula.

$$M=(+\times\gamma)/\alpha$$

The titanium content and the magnesium content of a solid titanium catalyst component (i) can also be determined by a method similar to the above method.

(6) Pore Volume, First Pore Distribution Index, Second Pore Distribution Index, and Pore Volume The pore volume was measured with a mercury porosimeter (trade name: PoreMaster 60GT, manufactured by Quantachrome Instruments). The data obtained were analyzed with analysis software (trade name: Poremaster for Windows) included with the apparatus to determine cumulative values of pores with sizes of 0.001 to 0.1 μm and 0.1 to 1.0 μm. The values were used as x (0.001 to 0.1 μm) and y (0.1 to 1.0 μm) in the following formulae; the first pore distribution index was determined by formula I below, and the second pore distribution index was determined by formula I' below.

First pore distribution index=x/y (I)

In formula I, x is a cumulative pore volume of pores with a size of 0.001 to 0.1 μm, and y is a cumulative pore volume of pores with a size of 0.1 to 1.0 μm, the cumulative pore volumes being measured with a mercury porosimeter.

Second pore distribution index=xα/xβ (I')

In formula I', xα is a cumulative pore volume of pores with a size of 0.01 to 0.1 μm, and xβ is a cumulative pore volume of pores with a size of 0.001 to 1.0 μm, the cumulative pore volumes being measured with a mercury porosimeter.

to S-5 and CS-1 to CS-4 are shown in Table 1. In the production of CS-2 to CS-4, stirring and bubbling were performed at 50° C. for 5 hours, and then stirring and bubbling were performed at an increased temperature of 60° C. for 1 hour.

TABLE 1

|  | Solid complex compound | Slurry concentration g/L | Temperature ° C. | Time hr | Dry nitrogen feed rate* | | Pore volume mm³/g | First pore distribution index | Second pore distribution index |
| --- | --- | --- | --- | --- | --- | --- | --- | --- | --- |
|  |  |  |  |  | NL/hr | NL/(hr · L) |  |  |  |
| Example 1 | S-1 | 100 | 45 | 37 | 11 | 28 | 208 | 2.4 | 0.644 |
| Example 2 | S-2 | 100 | 45 | 35 | 11 | 28 | 211 | 3.1 | 0.645 |
| Example 3 | S-3 | 100 | 45 | 23 | 11 | 28 | 215 | 4.1 | 0.721 |
| Example 4 | S-4 | 100 | 45 | 23 | 8 | 20 | 152 | 5.6 | 0.750 |
| Example 5 | S-5 | 100 | 48 | 14 | 11 | 28 | 168 | 6.3 | 0.744 |
| Comparative Example 1 | CS-1 | 30 | 60 | 7 | 6 | 15 | 236 | 0.5 | 0.292 |
| Comparative Example 2 | CS-2 | 30 | 50→60 | 5→1 | 6 | 15 | 227 | 1.1 | 0.467 |
| Comparative Example 3 | CS-3 | 30 | 50→60 | 5→1 | 6 | 15 | 189 | 1.3 | 0.513 |
| Comparative Example 4 | CS-4 | 30 | 50→60 | 5→1 | 6 | 15 | 208 | 1.7 | 0.548 |

*NL/hr: Volume of fed inert gas in standard state, per hour (7) Evaluation of flowability of propylene block copolymer The flowability of a block copolymer obtained was evaluated by the falling seconds ratio between before and after subjecting a certain amount of polymer to a heat and load treatment. For the evaluation, a funnel having a shape illustrated in the Figure was used. The funnel has the following dimension: the top diameter (the length of a illustrated in the Figure), 94.9 mm; the height (the length of b illustrated in the Figure), 114 mm; and the inner diameter of a section through which the polymer is fallen (the length of c illustrated in the Figure), 11.9 mm. The number of seconds required for falling of 100 g of the copolymer was measured using a metal (stainless steel) funnel having an inner diameter of 11.9 mm, and the measured value was used as X (sec) in the following formula. The polymer was held at 80° C. for 24 hours under a load of 10 kg. The number of seconds required for falling of 100 g of the copolymer was measured again using the metal funnel, and the measured value was used as Y (sec) in the following formula. The ratio of Y to X was calculated by the following formula, and the value obtained was used as an index for evaluation of flowability.

Falling seconds ratio (%)={(Y/X) −1}×100

[Preparation of Solid Compound]

Solid compounds used in Examples were prepared by the following method.

A solid compound was obtained by stirring, at 250 rpm, a suspension of decane and a starting complex formed of 2 to 3 moles of ethanol coordinated to 1 mole of magnesium chloride while bubbling dry nitrogen through the suspension. To determine the first pore distribution index and the second pore distribution index, a portion of the solid compound obtained was filtered, after which hexane washing and vacuum drying were performed, and the pore volume was measured using a mercury porosimeter. The slurry concentration, temperature, time, dry nitrogen feed rate, pore volume, first pore distribution index, and second pore distribution index in the production of solid compounds S-1

NL/(hr•L): Volume of fed inert gas in standard state, per hour and per liter of slurry

[Preparation of Solid Titanium Catalyst Component]

The solid compound (S-1) having a first pore distribution index, which was calculated by formula I above from the pore volumes of pores with sizes in the range of 0.001 to 1.0 μm measured using a mercury porosimeter, of 2.4 in an amount of 23 mmol in terms of Mg atoms was wholly introduced into 100 ml of titanium tetrachloride maintained at −20° C. with stirring. The mixed solution was heated to 80° C. over 6.5 hours, and when 80° C. was reached, di-2-ethylhexyl cyclohexane-1,2-dicarboxylate (trans rate: 75%) serving as an electron donor (e-1) was added. The resulting solution was further heated to 110° C. over 30 minutes, and when 110° C. was reached, 2-isopropyl-2-isobutyl-1,3-dimethoxypropane serving as an electron donor (e-2) was added. While being maintained at 110° C., the solution was held at this temperature for 30 minutes. After completion of reaction, a solid portion was collected by heat filtration. The solid portion was resuspended in 100 ml of titanium tetrachloride, and then a heat reaction was performed again at 110° C. for 15 minutes. This procedure was repeated twice. A solid portion was collected again by heat filtration and thoroughly washed with 100° C. decane and hexane until there was no detectable free titanium compound in the washings. A solid titanium catalyst component (C-1) prepared by the above procedure was stored in the form of a decane slurry, a part of which was dried for the purpose of investigating a catalyst composition. The results are shown in Table 2.

Solid titanium catalyst components (C-2) to (C-5) and (CC-1) to (CC-4) were obtained in the same manner except that the solid compound (S-1) was replaced with solid compounds (S-2) to (S-5) and (CS-1) to (CS-4). The results are shown in Table 2.

TABLE 2

| | Solid titanium catalyst component | Solid complex compound | First pore distribution index | Electron donor (e-1) | Electron donor (e-2) |
|---|---|---|---|---|---|
| Example 1 | C-1 | S-1 | 2.4 | di-2-ethylhexyl cyclohexane-1,2-dicarboxylate | 2-isopropyl-2-isobutyl-1,3-dimethoxypropane |
| Example 2 | C-2 | S-2 | 3.1 | di-2-ethylhexyl cyclohexane-1,2-dicarboxylate | 2-isopropyl-2-isobutyl-1,3-dimethoxypropane |
| Example 3 | C-3 | S-3 | 4.1 | di-2-ethylhexyl cyclohexane-1,2-dicarboxylate | 2-isopropyl-2-isobutyl-1,3-dimethoxypropane |
| Example 4 | C-4 | S-4 | 5.6 | di-2-ethylhexyl cyclohexane-1,2-dicarboxylate | 2-isopropyl-2-isobutyl-1,3-dimethoxypropane |
| Example 5 | C-5 | S-5 | 6.3 | di-2-ethylhexyl cyclohexane-1,2-dicarboxylate | 2-isopropyl-2-isobutyl-1,3-dimethoxypropane |
| Comparative Example 1 | CC-1 | CS-1 | 0.5 | di-2-ethylhexyl cyclohexane-1,2-dicarboxylate | 2-isopropyl-2-isobutyl-1,3-dimethoxypropane |
| Comparative Example 2 | CC-2 | CS-2 | 1.1 | di-2-ethylhexyl cyclohexane-1,2-dicarboxylate | 2-isopropyl-2-isobutyl-1,3-dimethoxypropane |
| Comparative Example 3 | CC-3 | CS-3 | 1.3 | di-2-ethylhexyl cyclohexane-1,2-dicarboxylate | 2-isopropyl-2-isobutyl-1,3-dimethoxypropane |
| Comparative Example 4 | CC-4 | CS-4 | 1.7 | di-2-ethylhexyl cyclohexane-1,2-dicarboxylate | 2-isopropyl-2-isobutyl-1,3-dimethoxypropane |

| | Ti (mg/g-cat.) | Mg (mg/g-cat.) | e-1 (mg/g-cat.) | e-2 (mg/g-cat.) | Oet (mg/g-cat.) |
|---|---|---|---|---|---|
| Example 1 | 27 | 200 | 49 | 58 | <1 |
| Example 2 | 26 | 200 | 46 | 55 | <1 |
| Example 3 | 29 | 200 | 46 | 58 | <1 |
| Example 4 | 27 | 200 | 44 | 62 | <1 |
| Example 5 | 27 | 190 | 47 | 64 | <1 |
| Comparative Example 1 | 26 | 200 | 58 | 40 | 3 |
| Comparative Example 2 | 25 | 200 | 47 | 58 | <1 |
| Comparative Example 3 | 27 | 190 | 42 | 49 | <1 |
| Comparative Example 4 | 26 | 190 | 44 | 53 | 1 |

[Production of Propylene Block Copolymer]

In a 2-liter capacity polymerization apparatus equipped with a stirrer, 500 g of propylene and 5.3 NL of hydrogen were placed at room temperature. Thereafter, 0.5 mmol of triethylaluminum, 0.05 mmol of cyclohexylmethyldimethoxysilane, and the solid titanium catalyst component (C-1) in an amount of 0.004 mmol in terms of titanium atoms were further added thereto. These were rapidly heated to 70° C., and polymerization was allowed to proceed at 70° C. for 20 minutes, after which the propylene was purged while decreasing the temperature. Thereafter, nitrogen purging was repeated several times. After 0.08 NL of hydrogen was added, gas-phase polymerization was performed at a total pressure of 0.4 MPa with a gas ratio: ethylene/(ethylene+propylene)=44 mol %. The polymerization was performed until the decane soluble component quantity (dsol) reached 30% to 35%. After completion of the reaction, the reaction was stopped with a small amount of methanol, and the ethylene/propylene mixed gas was purged. Furthermore, the resulting polymer particles were vacuum dried at room temperature overnight to obtain a propylene block copolymer (P-1). The polymerization activity, MFR, BD, dsol, copolymer section [η], and falling seconds ratio of the polymer obtained are shown in Table 3.

Examples 1 to 5 and Comparative Examples 1 to 4

Propylene block polymers (P-2) to (P-5) and (CP-1) to (CP-4) were obtained in the same manner as the production of the propylene block copolymer (P-1) except that the solid titanium catalyst component (C-1) was replaced with solid titanium catalyst components (C-2) to (C-5) and (CC-1) to (CC-4). The results are shown in Table 3.

TABLE 3

|  | Propylene block copolymer | Solid titanium catalyst component | Polymerization activity Kg-PP/g-cat. | MFR g/10 min | BD g/ml | C10 sol. mass % | Copolymer section [η] dl/g | Ethylene content of copolymer section mol % | Falling seconds ratio — |
|---|---|---|---|---|---|---|---|---|---|
| Example 7 | P-1 | C-1 | 31.3 | 18.0 | 0.43 | 31.4 | 2.8 | 41 | 11.0 |
| Example 8 | P-2 | C-2 | 33.9 | 14.5 | 0.44 | 32.3 | 2.8 | 40 | 24.6 |
| Example 9 | P-3 | C-3 | 32.8 | 12.5 | 0.45 | 34.4 | 2.6 | 40 | 29.3 |
| Example 10 | P-4 | C-4 | 33.3 | 14.0 | 0.44 | 31.3 | 2.8 | 40 | 27.5 |
| Example 11 | P-5 | C-5 | 33.9 | 14.5 | 0.43 | 32.1 | 2.9 | 40 | 19.0 |
| Comparative Example 5 | CP-1 | CC-1 | 29.7 | 18.0 | 0.46 | 29.8 | 2.4 | 40 | 75.4 |
| Comparative Example 6 | CP-2 | CC-2 | 33.3 | 22.0 | 0.45 | 30.9 | 2.4 | 41 | 50.2 |
| Comparative Example 7 | CP-3 | CC-3 | 27.5 | 26.0 | 0.42 | 31.0 | 2.2 | 40 | 75.0 |
| Comparative Example 8 | CP-4 | CC-4 | 31.7 | 19.0 | 0.45 | 31.3 | 2.5 | 40 | 63.9 |

When the solid titanium catalyst components (C-1) to (C-5) were used, propylene block copolymers having evaluated flowability values of 40% or less were produced.

This application claims priority from Japanese Patent Application No. 2018-040597 filed Mar. 7, 2018, the contents of which are incorporated herein in its entirety.

The invention claimed is:

1. A method for producing a propylene block copolymer, the method comprising:
a first polymerization step of preparing a crystalline propylene (co)polymer by polymerizing propylene and an optional α-olefin in the presence of a solid titanium catalyst component (i) produced by bringing
a solid compound (S) containing a magnesium compound (II-0) and having a first pore distribution index of 2 or more and a second pore distribution index of more than 0.5,
the first pore distribution index being represented by formula I:

First pore distribution index=$x/y$ (I)

where x is a cumulative pore volume of pores with a size of 0.001 to 0.1 μm, and y is a cumulative pore volume of pores with a size of 0.1 to 1.0 μm, the cumulative pore volumes being measured with a mercury porosimeter,
the second pore distribution index being represented by formula I':

Second pore distribution index=$x\alpha/x\beta$ (I')

where xα is a cumulative pore volume of pores with a size of 0.01 to 0.1 μm, and xβ is a cumulative pore volume of pores with a size of 0.001 to 1.0 μm, the cumulative pore volumes being measured with a mercury porosimeter,
a titanium compound represented by formula IV:

$Ti(OR)_gX_{4-g}$ (IV)

where R is a hydrocarbon group, X is a halogen atom, and g is an integer satisfying 0≤g≤4, and
an electron donor
into contact with each other; and
a second polymerization step of polymerizing the crystalline propylene (co)polymer prepared in the first polymerization step and a raw material of a polymer selected from the group consisting of rubber components, amorphous or low-crystallinity ethylenepropylene copolymers (EPR), and amorphous ethylenea-α-olefin copolymers.

2. The method for producing a propylene block copolymer according to claim 1, wherein the first polymerization step and the second polymerization step are both performed in the presence of hydrogen.

3. The method for producing a propylene block copolymer according to claim 1, wherein the magnesium compound (II-0) is a solid complex compound represented by formula II:

$MgX_aR_{sb}\cdot(RtOH)_m$ (II)

where X is a halogen atom, Rs is a heteroatom-containing hydrocarbon group, Rt is a hydrocarbon group optionally containing a heteroatom, m is a real number satisfying 2.0≤m ≤3.3, a is an integer satisfying 0≤a≤2, b is an integer satisfying 0≤b≤2, and a plus b is 2,
provided that when a is 0 in formula II, g is not 4 in formula IV.

4. A solid titanium catalyst component produced by bringing
a solid compound (S) containing a magnesium compound (II-0) and having a first pore distribution index of 2 or more and a second pore distribution index of more than 0.5,
the first pore distribution index being represented by formula I:

First pore distribution index=$x/y$ (I)

where x is a cumulative pore volume of pores with a size of 0.001 to 0.1 μm, and y is a cumulative pore volume of pores with a size of 0.1 to 1.0 μm, the cumulative pore volumes being measured with a mercury porosimeter,
the second pore distribution index being represented by formula I':

Second pore distribution index=$x\alpha/x\beta$ (I')

where xα is a cumulative pore volume of pores with a size of 0.01 to 0.1 μm, and xβ is a cumulative pore volume of pores with a size of 0.001 to 1.0 μm, the cumulative pore volumes being measured with a mercury porosimeter, a titanium compound represented by formula IV:

$Ti(OR)_gX_{4-g}$ (IV)

where R is a hydrocarbon group, X is a halogen atom, and g is an integer satisfying 0≤g≤4, and
an electron donor
into contact with each other.

5. The method for producing a propylene block copolymer according to claim 1, wherein the first pore distribution index is 2 or more and 12 or less.

* * * * *